United States Patent

La Monica

[15] 3,645,100
[45] Feb. 29, 1972

[54] LEACHING CHAMBER UNIT FOR SOIL ABSORPTION SYSTEM

[72] Inventor: Frank La Monica, Avon, Conn.
[73] Assignee: A. Rotondo & Sons, Inc., Avon, Conn.
[22] Filed: Jan. 16, 1970
[21] Appl. No.: 3,358

[52] U.S. Cl. ............................................................. 61/13
[51] Int. Cl. ...................................................... E02b 13/00
[58] Field of Search ................... 61/10, 11, 12, 13; 210/293

[56] References Cited

UNITED STATES PATENTS

| | | | |
|---|---|---|---|
| 2,782,604 | 2/1957 | Mixon | 61/11 |
| 2,803,948 | 8/1957 | Dorfman | 61/11 |
| 2,866,319 | 12/1958 | Nicholson | 61/11 |
| 1,220,891 | 3/1917 | Reed et al. | 61/10 |
| 2,366,522 | 1/1945 | Gutman | 61/13 X |
| 2,378,239 | 6/1945 | Myron | 61/10 X |
| 3,339,366 | 9/1967 | Gogan et al. | 61/13 |
| 3,401,526 | 9/1968 | Rodgers | 61/13 |
| 2,802,339 | 8/1957 | Fogerty | 61/11 |

FOREIGN PATENTS OR APPLICATIONS 29,121 4/1911 Great Britain .......................... 210/293

Primary Examiner—David J. Williamowsky
Assistant Examiner—David H. Corbin
Attorney—Joseph R. Spalla

[57] ABSTRACT

An effluent distributing leaching chamber unit adapted for arrangement with others in trench and field configurations to provide large area subsurface soil absorption systems. Each leaching chamber unit is a downwardly open rectangular precast concrete structure adapted to rest squarely on a prepared absorption bed and thereby enclose within its top, side, and end walls a volume of open space. Within the top wall there is formed an end to end extending flow conduit with complimentary shaped terminals in the end walls to permit flush serial end to end connection of units. The ceiling of the top wall is slotted at given intervals through to the flow conduit thereby to distribute and meter flow into each compartment. The side and end walls of a unit are also provided with rows of perforations above absorption bed level to allow air movement and, after row levels have been reached, fluid to pass out of and from one compartment to another.

9 Claims, 8 Drawing Figures

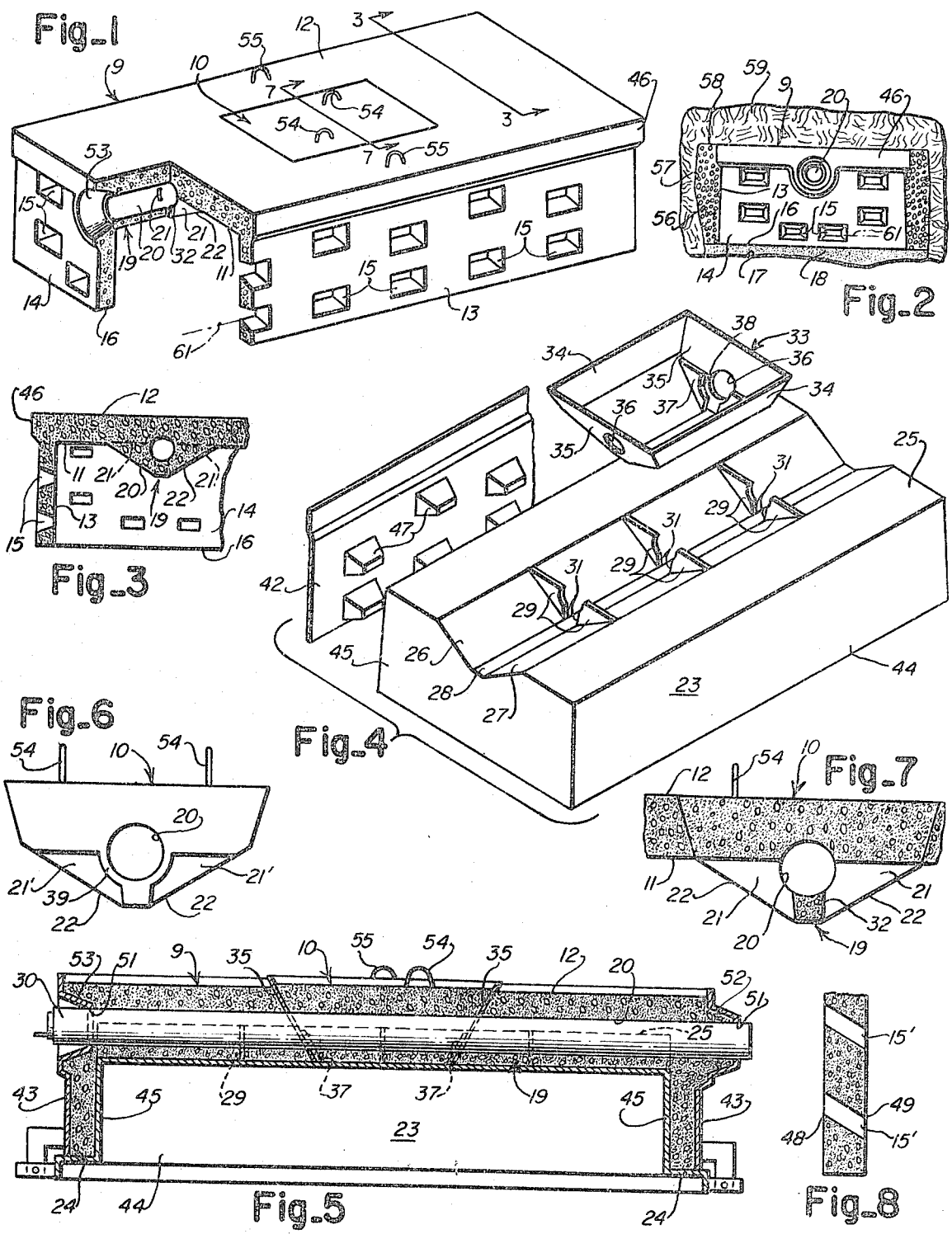

LEACHING CHAMBER UNIT FOR SOIL ABSORPTION SYSTEM

BACKGROUND OF THE INVENTION

This invention relates to subsurface fluid absorption systems for purifying septic tank effluents; more particularly it relates to precast leaching chamber units adapted to be interconnected with one another in trench configurations to provide an absorption trench system; and specifically it relates to leaching chamber units which carry and distribute flow to all connected chambers with provision for metering flow into each chamber.

Subsurface fluid absorption systems known to the art and now generally in vogue take the form of trenches partially filled with gravel stone within which a series of tiles are supported above the bottom of the trench. The tiles are spaced from one another to allow fluid within the tiles to filter through the stone and into the soil for absorption. Salient shortcomings of this form of absorption system reside in the fact that the stone reduces the volume of free space and hence the capacity of the trench, inhibits air movement, and increases tendency to become clogged; in which event a new system needs to be installed as there is no practical way to clean these systems. Proposals to overcome some of the shortcomings of stone supported tile absorption trenches through elimination of stone are represented by Gutman U.S. Pat. No. 2,366,522 and Gogan et al., U.S. Pat. No. 3,339,366.

Gutman describes an assembled structure comprising perforated pipe sections suspended from or supported interiorly of a semicylindrical or rectangular open bottomed structure. Such a multipart structure presents difficulties in placement and assembly and is subject to dislocations due to shifting earth as would interrupt and block flow from section to section. Other shortcomings of Gutman reside in the fact that there is no practical way to facilitate cleaning or to modify the structure with any facility to meter flow as required to control distribution to all areas.

Gogan et al., like Gutman, is directed to the elimination of stone to promote aeration and free passage in all directions of fluid from unit to unit of a multiunit absorption field. The Gogan unit comprises a platform supported by widely spaced pedestals and utilizes shiplap joints between adjacent platforms. The fact that the pressure per unit area exerted by the relatively small area of contact of the pedestals with the absorption bed surface is high, coupled with the fact that soil porosity is not uniform and it is usually impossible to maintain level bed surfaces, promotes the tendency of the units to become dislocated and fracture. Further the wide spaces between pedestals require provision of mesh material to hold back entry of surrounding stone and soil into the interior of structures facing trench walls. Also the fact that the effluent to be absorbed is introduced directly to the system bed at one or more entry points increases the tendency of the fluid to wash out pot holes and otherwise flow and saturate and eventually clog the absorption bed surface at the lowest point of the absorption bed.

SUMMARY OF THE INVENTION

In accordance with the present invention the shortcomings of the prior art are overcome in the provision of space enclosing open bottomed leaching chamber units of monolithically precast concrete characterized by an in ceiling formed flow through conduit for distributing flow to all units of the system, and transverse slots affording communication from the conduit to the interior of each chamber. The unit is further characterized by the provision of an inspection/cleaning cover formed to allow for increasing slot areas as required to differentially meter flow into each chamber to accommodate grade. In addition, the unit is characterized by an ability to dam and hold fluid for absorption within each enclosed compartmented space to the level of openings in end and sidewalls to promote ponding before spillover to the trench sidewall or the next in line chamber unit, and in the provision of air movement openings.

As each chamber unit is supported by the entire perimetral area of the edges of the side and end wall there is little tendency for units to shift, to fracture, or to be dislocated. Also in that bell and spigot terminals at either end of the conduit of each unit act as universal joints the units may accommodate to different levels or grade of the absorption bed surface without danger of fracture of any chamber unit. Further, should the bed within any chamber unit, as for example the first in the series of units forming a trench, become clogged the remainder of the system continues to function.

An object of the invention is to provide an improved fluid absorption system characterized by flow-carrying and fluid-absorbing leaching chamber units.

Another object of the invention is in the provision of an easily renewed leaching or soil absorption system.

Another object of the invention is in the provision of a system of leaching chamber units wherein flow is distributed and metered to all areas of the system.

A further object of the invention is in the provision of a system of leaching chamber units which promotes interunit air movement and prolongs useful life of the system.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a perspective view with sections cut away showing the leaching chamber unit of the invention;

FIG. 2 is an end elevational view showing a leaching chamber unit installed in a prepared trench;

FIG. 3 is a partial cross-sectional view taken along lines 3—3 of FIG. 1;

FIG. 4 is an exploded partial perspective view showing apparatus for forming a leaching chamber unit;

FIG. 5 is a side elevational view showing a cross section of a mold and a leaching chamber unit being formed therein;

FIG. 6 is an end elevational view of the inspection cover of a leaching chamber unit showing the slot blocking annular breakaway wall formed to differentially adjust or meter the volume of flow into each chamber unit interior as required depending on the position of a unit from the flow source in a serial array;

FIG. 7 is a cross-sectional view taken along lines 7—7 of FIG. 1 through the central section of the inspection cover transverse to the flow conduit showing the open lateral slots through which fluid passes from conduit to leaching chamber; and FIG. 8 is a fragmentary cross sectional view of a vertical wall of the leaching chamber unit showing by modification of the openings designed to preclude entry of stone and soil into the chamber unit interior.

Referring now to the drawings wherein like reference characters designate like or corresponding parts throughout the several views there is shown in FIG. 1 a leaching chamber unit generally designated by reference numeral 9 which, together with others, preferably in serial end to end configuration, or otherwise in end to end and side to side abutting field configuration, forms a novel septic effluent disposal or soil absorption system.

With continued reference to FIG. 1 and also to FIG. 5 the leaching chamber unit 9, except for a centrally located removable inspection-cleanout cover generally designated by reference numeral 10 formed at the same time as the unit, is a single monolithically precast concrete rectangular structure. The chamber unit 9 is open at the bottom and when placed in use forms a chamber compartment defined by the underside 11 of a top wall 12 and the inner sides of side 13 and end walls 14. The side and end walls 13 and 14 have inwardly bevelled openings 15 located at a number of vertically spaced levels above the bottom edge 16 of the structure for reasons hereinafter made apparent. The entire perimetral area of the edges 16 of the side and end walls 13 and 14 rest squarely on and evenly support the weight of the unit 9 on an excavated trench bed 17 (FIG. 2) preferably covered with a layer of sand 18 on the order of 1-2 inches to facilitate cleaning.

Referring now particularly to FIG. 3, the underside 11 of the flat surfaced top wall 12, and the cover 10 as best seen in FIGS. 6 and 7, have depending from their undersides central rib sections generally designated by reference numeral 19 extending from end to end forming a thickened portion to accommodate the major portion of a continuous through flow circular conduit 20 within the top wall 12 and through the end walls 14. The conduit is in communication with the interior of the chamber by way of pairs of aligned laterally directed or transverse slots 21 formed at intervals along the length of the rib section 19. The slots 21 extend through the converging bevelled portions 22 of the rib sections 19 on opposite sides of the conduit 20 to and into opposite arcuate portions of the wall of the conduit 20. One slot pair 21 (FIG. 7) is formed intermediate the ends of the rib section 19 of the removable cover 10. The arcuate opening of the slots 21 in the conduit wall and the width of the slots 21 offer controlled resistance to flow into and thereby meters flow into each chamber unit 9.

Referring now to FIGS. 4 and 5 there is shown apparatus for molding the leaching chamber unit 9 of the invention. The mold apparatus comprises a generally rectangular core 23 having a lower perimetral flange 24 (FIG. 5) which together define the interior shape and bottom edges 16 of the chamber unit 9. The top surface 25 of the core 23 has a central lengthwise depression extending from end to end formed by inwardly downwardly sloping sides 26 and 27 connected to a narrow center section 28 parallel to the surface 25 of the core 23. Welded at spaced intervals to the core depression are pairs of generally triangular elements 29 of a width or thickness to form the oppositely directed pairs of aligned lateral slots 21 in the rib section 19 of the ceiling of the chamber that provide communication between the interior of the chamber and the conduit.

The outer edges of pairs of elements 29 are shaped to fit the sloping surfaces 26 and 27 defining the depression. Their upper edges are flush with the core top surface 25 and their inner facing edges 31 angle downwardly toward and are spaced the width of the central section 28. The opening between facing edges 31 of the slot forming elements 29 are contoured to closely accommodate a conduit forming circular tube 30 (FIG. 5) and, the opening below the so circularly contoured edges 31, form the fluid carry through bottom 32 of the conduit 20 at the slot locations.

With reference to FIGS. 4 and 5 the top cover 10 of the chamber unit 9 is formed by an open bottomed tray 33 adapted to be placed and held on the top of the core 23. The tray sides 34 are inwardly sloping and rest on the core top surface 25, and the sides 35 facing the ends 45 of the core 23 are shaped complimentary to the core depression and are provided with circular openings 36 to closely accommodate the rubber composition conduit forming tube 30. With particular reference to FIG. 4 the end facing sides 35 are built up internally to form pairs of elements 37 similar to those pairs 29 welded to the core 23 but which differ therefrom in that the upper edges will be below the surface 25 of the core 23 to allow the edges of sides 34 to rest on the core surface 25, and the circular contour of the facing edges 38 are of larger diameter so that the edges 38 will be spaced from the tube 30 to allow cement flow around the tube thereby to form as clearly viewed in FIG. 6 slots 21' separated or closed to the conduit 20 by thin annular wall portions 39, sections of which may be easily chipped and broken away to provide additional open arcuate slot area communication between conduit 20 and compartment as may be required to differentially meter flow according to the position of a chamber unit 9 in a series of units 9 to provide even distribution of flow.

The lateral slots 21 whereby the effluent slow conduit 20 communicates with the compartment and which are formed by slot forming elements 29 are most clearly seen in FIGS. 1 and 7. It is to be noted that each of the oppositely facing slots 21 in the wall of the conduit 20 defines an arc on the order of 65° (FIG. 7); 20° above and 45° below the horizontal diameter line of the conduit 20. This arc may be varied as desired to tailor the flow to each chamber.

The mold also comprises outer side and end walls 42 (FIG. 4) and 43 (FIG. 5) respectively adapted to be hinged or otherwise secured to the core flange 24 and spaced from the core side and end walls 44 and 45. The outer mold walls extend above the top surface 25 of the core as viewed in FIG. 5 to define the thickness of the top wall 12 of the leaching chamber unit 9. Also as viewed in FIG. 4 the outer mold sidewalls 42 and 43 are outwardly offset so that the top wall edges 46 overhang as most clearly seen in FIGS. 1 and 2, to accommodate air space below abutting top wall edges 46 between slightly upwardly bevelled end and side wall abutting units 9 that will allow relative movement between adjacent units 9. As seen best in FIG. 4 the mold outer walls 42 and 43 are further provided with rectangular inwardly angled bosses 47 which when the apparatus is set for a pour as in FIG. 5 make contact with the mold core walls 44 and 45 and thereby form the rows of openings 15 in the leaching chamber unit side and end walls 13 and 14.

As noted above each of the outer walls of the mold apparatus may be suitably secured or supported in place by the core flange to allow their being moved or removed to permit stripping of the chamber unit from the mold apparatus. The mold apparatus for making the leaching chamber unit 9 may be similar to that disclosed in U.S. Pat. No. 25,758 issued to applicant's assignee modified to provide the product of this invention.

FIG. 8 shows a preferred form of upwardly angled wall perforation 15' wherein the lower edge 48 of the opening on the inner side of the wall is higher than the upper edge 49 of the outer side of the opening to prevent entry of stone into the chamber interior.

As most clearly viewed in FIG. 5 the outer mold end walls are provided with circular openings 51 to accommodate the conduit forming tube 30. The tube 30 which is designed to easily strip away from concrete will be sealed at both ends so that it may be pressurized to rigidity by compressed air to the design diameter while the concrete is curing and thereafter deflated and stripped for removal axially of the openings 51 in the end walls 43 and those holes 36 in the inspection cover forming tray 33.

The outer end walls 43 of the mold about the circular openings 51 therein are also shaped to form at opposite terminal ends of the conduit 20 a bell-shaped extension 52 and a complimentary shaped recess 53 (FIG. 1) to accommodate the extension 52 of an immediately preceding unit 9 in a series. The mold apparatus shown in FIG. 5 will be provided between the spaces defining the product walls with reenforcing rods (not shown) prior to a pour. After the cement is cured and the tube 30 is removed axially, the formed inspection cover 10 and the tray 33 which isolated the cement therein from the rest of the unit, will first be lifted by means of lifting hooks 54 formed in the cover and then overturned to remove the tray after which the cover 10 may be placed in the cover opening. Thereafter the entire product will be then stripped in a fashion such as disclosed in said RE. 25,758 patent.

A pipe or pipes (not shown) from a septic tank or from a dosing chamber serving the system of the invention will lead into the recess 53 of the first unit 9 of each series of units 9 employed. The terminal 52 of the last unit 9 in a series may be plugged. As shown in FIG. 2 the units 9 will be serially arranged on the bed 17 of a trench with the bed covered with sand 18. The trench will be made wide enough so that after each unit 9 is lowered as by hooks 55 formed in the top wall 12, complimentary terminals 52, 53 are connected, and the ends 46 of serially adjacent units abut flush, stones 56 may fill the space between unit and trench sidewalls 13 and 57 respectively to the level of the top surface of each unit 9 and covered with pervious material 58 such as salt hay or builders paper and the trench covered with approximately one foot of soil 59.

In operation effluent will be introduced into and carried by the conduit 20. The flow above the lower edges of the lateral slots 21 will pass into the compartment or chamber and according to the total slot areas of each chamber unit 9. The fluid within each chamber may, as viewed in FIG. 2 accumulate to the level 61 (FIG. 1) of the lowest row or level of openings 15 before spilling over through the sidewalls 13 and through the end walls 14 to a next adjacent unit 9. The upper rows of openings 15 allow unimpeded air movement between units 9 as well as fluid flow should conditions so raise the fluid level.

It has been noted that clogging of trenches of absorption beds is due to slime accumulation within the top one half to one inch of the absorption bed. The action of air flow in the free space above absorption beds will slow accumulation of slime and, if a bed is allowed to rest in an oxygenated atmosphere inhospitable to bacteria, the slime will be destroyed and the bed renewed. Access to oxygen containing atmosphere may be provided by venting. Otherwise to renew a system of the invention only requires that the inspection covers 10 in each unit 9 be removed to allow access to clean the conduits 20 and to remove and replace the one inch of sand 18 placed on the bottom of the trench bed 17.

In a preferred embodiment the leaching chamber unit 9 has outside dimensions 8 feet long, 4 walls, wide and 1 foot 7½ inches high. The top wall 12 is 4 inches thick, side and end walls 13 and 14 are 2 and ¾ inches thick, and the openings 15 are 2 by 5 inches high and wide on the inside. The lowest level openings 15 are spaced at 1 foot intervals on the side walls 13 and closer on the end walls 14. The level 61 of the lower inside edges of the lowest level openings 15 are 3½ inches above the bottom edge 16 thereby allowing fluid accumulation to this level before spill over. The openings 15 in higher levels are generally spaced laterally at 2 foot intervals with the highest at the level of and opposite to, for viewing, the transverse slots 21. The conduit 20 is 4 inches in diameter with its axis 1 foot 3 inches above the bottom edge. Three pairs of slots 21 ¼ inch wide are provided in a preferred embodiment with one pair in the cover 10 and the others spaced inches to either side of the center pair. For purposes of standardization all units 9 are made the same with provision as noted above with reference to FIG. 6 for increasing slot area as required during installation in accordance with positions of the units 9 in a series.

The invention claimed is:

1. A single pour precast open bottomed unit adapted for placement with others on a prepared absorption bed to form a series of substantially rectangular compartments retaining fluid up to predetermined levels comprising,
    a top wall,
    side and end walls having at least one level of openings therein between the top and the bottom of said side and end walls, said openings permitting lateral fluid flow from within the compartment formed by the top, side and end walls when the fluid level therein exceeds the level of said openings,
    a fluid conduit within said top wall extending from end to end of said top wall and through said end walls,
    and slots transverse to said fluid conduit extending from the undersurface of said top wall through to and opening into said fluid conduit to allow fluid flowing within said fluid conduit to drain into said compartment,
    said top wall having a removable compartment inspection cover section through which said fluid conduit extends, said removable section on removal permitting inspection of and entry into said fluid conduit and compartment.

2. A unit as recited in claim 1, said removable cover section of said top wall containing one of said slots.

3. A unit as recited in claim 1 wherein said fluid conduit is cylindrical and said slots have widths and the openings thereof into said fluid conduit subtend predetermined arcs such that said slots offer controlled resistance to and meter flow into said compartment.

4. A unit as recited in claim 1 wherein one end of said fluid conduit has an outwardly extending bell shape and the other end has a complimentary shaped recess to enable a series of units to be placed in cooperative end to end abutting relationship with end wall openings aligned.

5. A unit as recited in claim 1 wherein said top wall overhangs the sidewalls whereby when the top wall edges of side by side units are abutting space is provided between adjacent sidewalls.

6. A unit as recited in claim 1, said openings in said sidewalls being formed at an angle extending upwardly from outside to inside, said lower edge defining the opening on the inside being higher than the upper edge defining the opening on the outside.

7. A unit as recited in claim 6 wherein said openings are rectangular.

8. A unit as recited in claim 1, said conduit being cylindrical, said removable section being provided with slots transverse to said fluid conduit therein, said slots extending from the undersurface of said top wall toward and short of said fluid conduit thereby to provide annular knockouts between fluid conduit and compartment which may be broken away to provide communicating openings between fluid conduit and compartment.

9. A unit as recited in claim 1, said undersurface of said top wall having a depending central rib section extending from end to end to substantially accommodate said fluid conduit and said transverse slots being in said rib section.

* * * * *